(12) United States Patent
Banik

(10) Patent No.: US 11,911,939 B2
(45) Date of Patent: Feb. 27, 2024

(54) METHOD OF FORMING A TRANSPORTATION SYSTEM WITH AN OVER-MOLDED FRICTION ELEMENT

(71) Applicant: ORBIS Corporation, Oconomowoc, WI (US)

(72) Inventor: Joachim Banik, Oconomowoc, WI (US)

(73) Assignee: ORBIS Corporation, Oconomowoc, WI (US)

( * ) Notice: Subject to any disclaimer, the term of this patent is extended or adjusted under 35 U.S.C. 154(b) by 301 days.

(21) Appl. No.: 17/113,530

(22) Filed: Dec. 7, 2020

(65) Prior Publication Data

US 2021/0178643 A1    Jun. 17, 2021

Related U.S. Application Data

(60) Provisional application No. 62/947,332, filed on Dec. 12, 2019.

(51) Int. Cl.
| | | |
|---|---|---|
| *B29C 45/16* | (2006.01) | |
| *B29C 45/14* | (2006.01) | |
| *B65D 19/00* | (2006.01) | |
| B29K 21/00 | (2006.01) | |
| B29L 31/00 | (2006.01) | |

(52) U.S. Cl.
CPC ...... *B29C 45/14065* (2013.01); *B65D 19/003* (2013.01); *B29K 2021/003* (2013.01); *B29L 2031/7178* (2013.01); *B65D 2519/00034* (2013.01); *B65D 2519/00069* (2013.01); *B65D 2519/00268* (2013.01)

(58) Field of Classification Search
CPC .......... B29C 45/14065; B29C 45/1615; B29C 45/1676; B29C 2045/14442
See application file for complete search history.

(56) References Cited

U.S. PATENT DOCUMENTS

| | | |
|---|---|---|
| 3,610,173 A | 10/1971 | McIlwraith et al. |
| 3,739,894 A | 6/1973 | Hinman |
| 4,051,787 A | 10/1977 | Nishitani et al. |

(Continued)

FOREIGN PATENT DOCUMENTS

| | | |
|---|---|---|
| CA | 3000168 A1 | 4/2017 |
| DE | 102018002545 A1 | 10/2019 |

(Continued)

OTHER PUBLICATIONS

European Patent Office, Extended European Search Report for EP 16852439.5, dated Feb. 25, 2019, 8 pages.

(Continued)

*Primary Examiner* — Edmund H Lee
(74) *Attorney, Agent, or Firm* — Greensfelder, Hemker & Gale, P.C.; Richard C. Himelhoch

(57) ABSTRACT

The invention is directed to an overmolded two-component friction element in a plastic pallet and to a method for forming the pallet. The friction element includes a rigid outer carrier member and an elastomeric material that is exposed at one or more ends. The friction element is first formed in an injection mold, and then is placed in a pallet mold. Resin is injected into the pallet mold around the sides of the friction element leaving the exposed elastomeric material form part of the pallet surface.

18 Claims, 24 Drawing Sheets

(56) References Cited

U.S. PATENT DOCUMENTS

| | | | |
|---|---|---|---|
| 4,200,272 A | 4/1980 | Godding | |
| 4,207,655 A | 6/1980 | MacMaster | |
| 4,706,793 A | 11/1987 | Masciarelli | |
| 5,153,052 A * | 10/1992 | Tanaka | B29C 45/1657 428/137 |
| 5,197,396 A | 3/1993 | Breezer et al. | |
| 5,404,829 A | 4/1995 | Shuert | |
| 5,413,052 A | 5/1995 | Breezer et al. | |
| 5,868,262 A | 2/1999 | Carson | |
| 6,006,677 A | 12/1999 | Apps et al. | |
| 6,129,195 A | 10/2000 | Matheny | |
| 6,874,428 B2 | 4/2005 | Apps | |
| 6,886,475 B2 | 5/2005 | Apps et al. | |
| 6,926,238 B1 | 8/2005 | Blessing | |
| 7,123,856 B2 | 10/2006 | Marumoto | |
| 7,311,302 B1 | 12/2007 | Farlow et al. | |
| 7,845,289 B2 | 12/2010 | Apps | |
| 8,006,629 B2 | 8/2011 | Naidu | |
| 8,210,107 B2 | 7/2012 | Muirhead | |
| 8,215,244 B2 | 7/2012 | Apps | |
| 8,264,839 B2 | 9/2012 | Shen et al. | |
| 8,739,706 B2 | 6/2014 | Dubois et al. | |
| 8,950,342 B2 | 2/2015 | Plattner | |
| 9,266,463 B2 | 2/2016 | Hindy | |
| 10,301,068 B2 | 5/2019 | Nottestad et al. | |
| 10,427,830 B2 | 10/2019 | McDade | |
| 10,479,007 B2 | 11/2019 | Guerry et al. | |
| 10,882,660 B2 | 1/2021 | D'Emidio et al. | |
| 2001/0049149 A1 | 12/2001 | Kennedy et al. | |
| 2002/0104465 A1 * | 8/2002 | Ohanesian | B65D 19/0012 108/57.25 |
| 2002/0195027 A1 | 12/2002 | Mallan et al. | |
| 2006/0022100 A1 | 2/2006 | Lan | |
| 2006/0201402 A1 | 9/2006 | Moore, Jr. et al. | |
| 2008/0029664 A1 | 2/2008 | Hsu | |
| 2010/0095875 A1 | 4/2010 | Hailston et al. | |
| 2011/0042118 A1 | 2/2011 | Fan | |
| 2012/0304898 A1 | 12/2012 | Dubois et al. | |
| 2013/0032984 A1 | 2/2013 | Moncavage | |
| 2013/0160680 A1 | 6/2013 | Ten Bok | |
| 2016/0207558 A1 | 7/2016 | Frankenberg | |
| 2017/0096255 A1 | 4/2017 | Nottestad et al. | |
| 2018/0093794 A1 | 4/2018 | McDade | |
| 2018/0264695 A1 | 9/2018 | Guerry et al. | |
| 2020/0070391 A1 | 3/2020 | Guerry et al. | |

FOREIGN PATENT DOCUMENTS

| | | |
|---|---|---|
| EP | 0242076 A2 | 10/1987 |
| EP | 3356245 | 8/2018 |
| EP | 3356245 B1 | 7/2020 |
| EP | 3835226 A1 | 6/2021 |
| FR | 2898109 A1 | 9/2007 |
| GB | 1540679 | 2/1979 |
| JP | 10194283 | 7/1998 |
| JP | 11079181 | 3/1999 |
| MX | 2018003719 A | 8/2018 |
| WO | 9733798 A1 | 9/1997 |
| WO | 2013159796 A1 | 10/2013 |
| WO | 2017058845 A1 | 4/2017 |

OTHER PUBLICATIONS

Russian Federal Institute of Industrial Property, International Search Report for PCT/US2016/054068, dated Jan. 12, 2017, 2 pages.

Russian Federal Institute of Industrial Property, Written Opinion of the International Searching Authority for PCT/US2016/054068, dated Jan. 12, 2017, 4 pages.

European Patent Office, Extended European Search Report for European Application No. 20213620.6, dated May 12, 2021, 13 pages May 12, 2021.

* cited by examiner

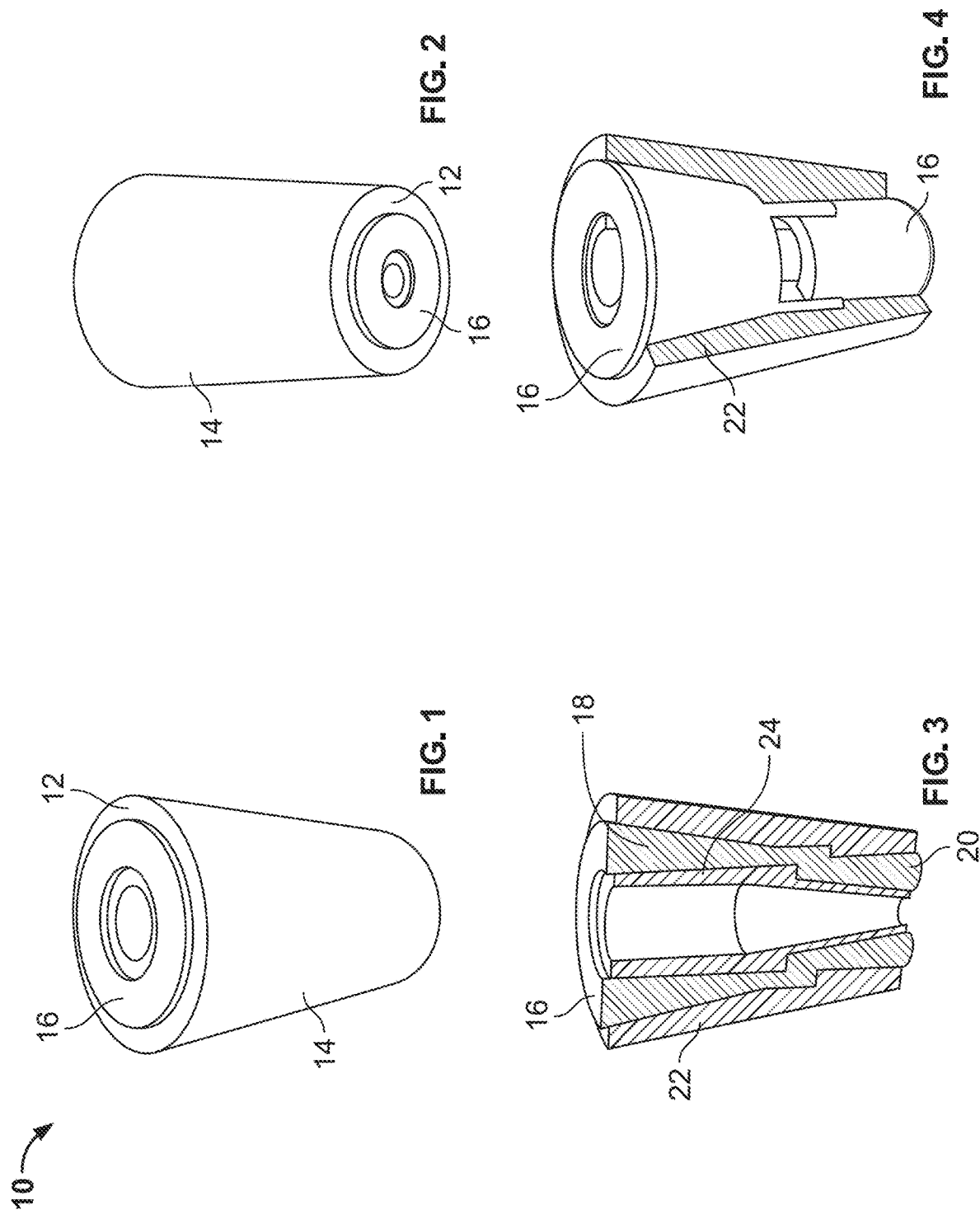

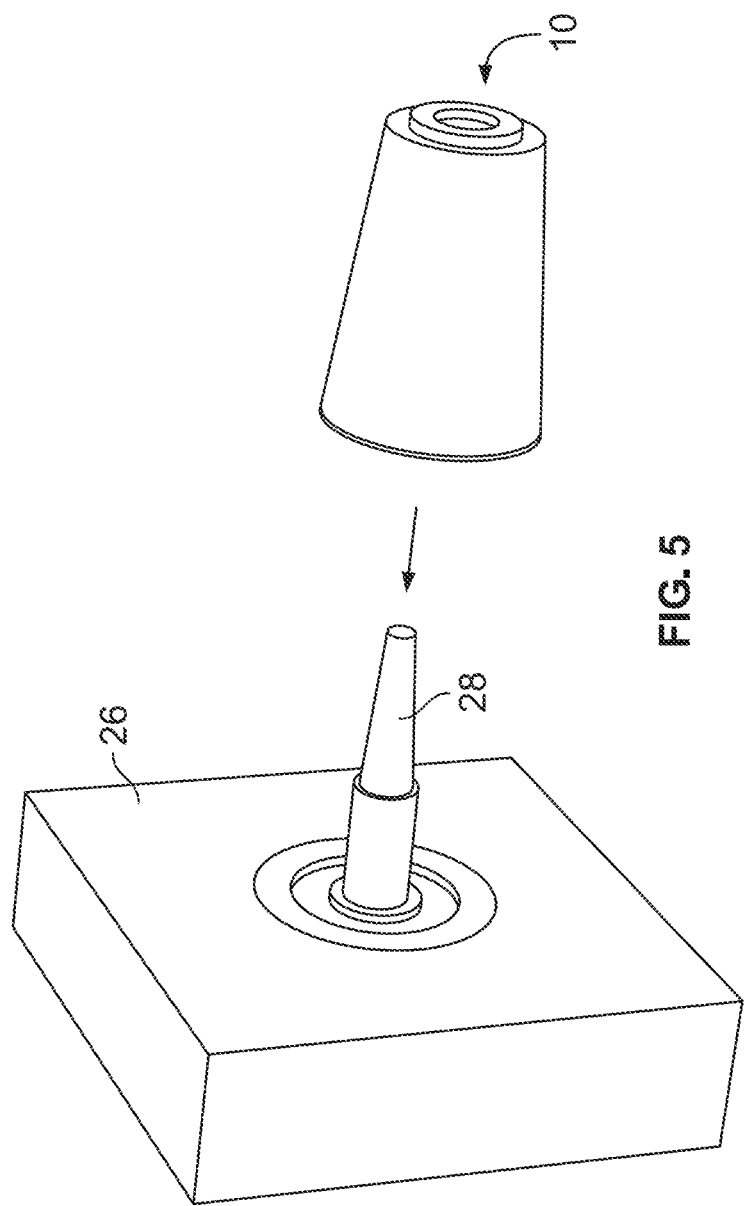

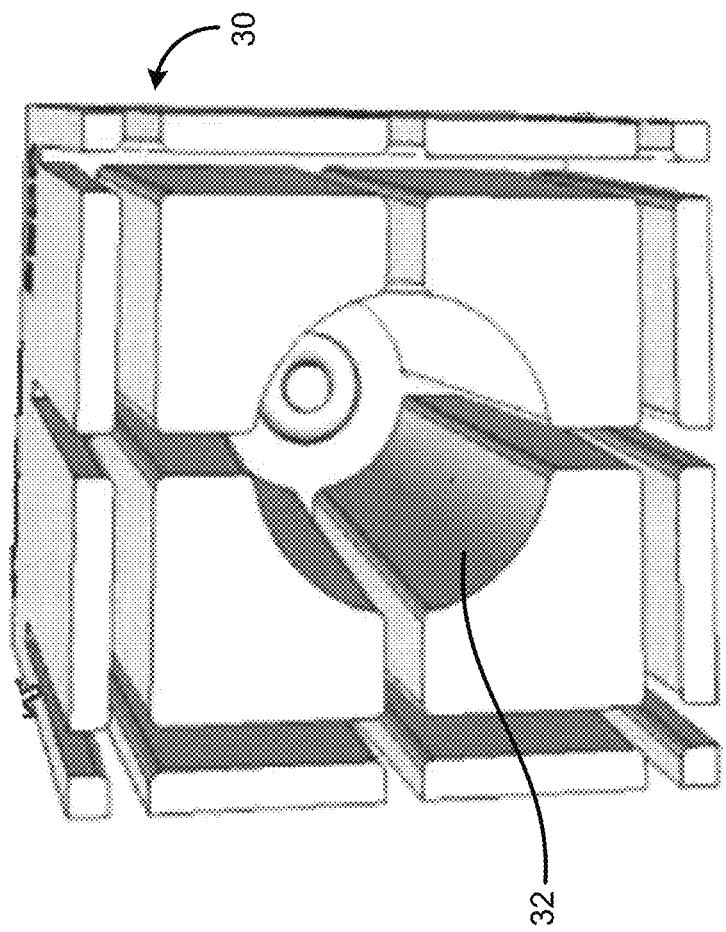

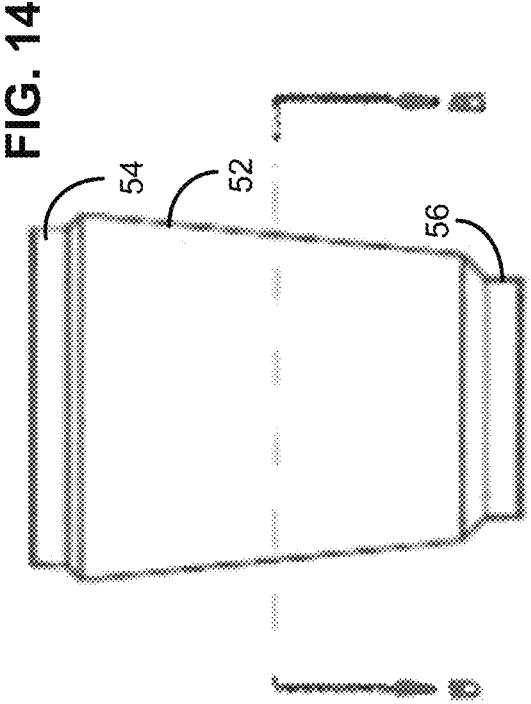

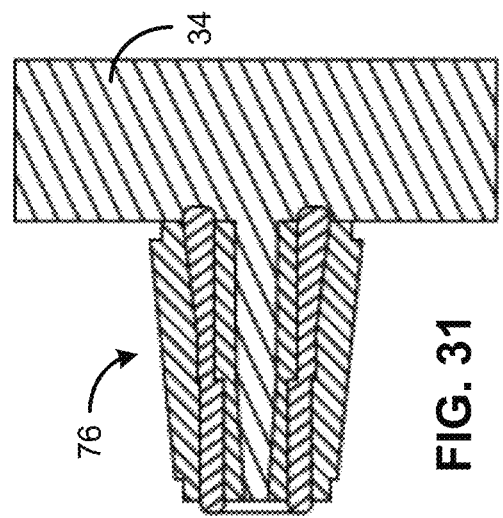

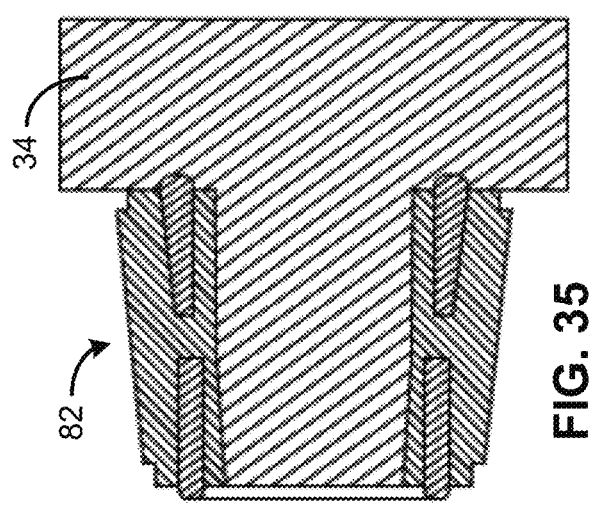

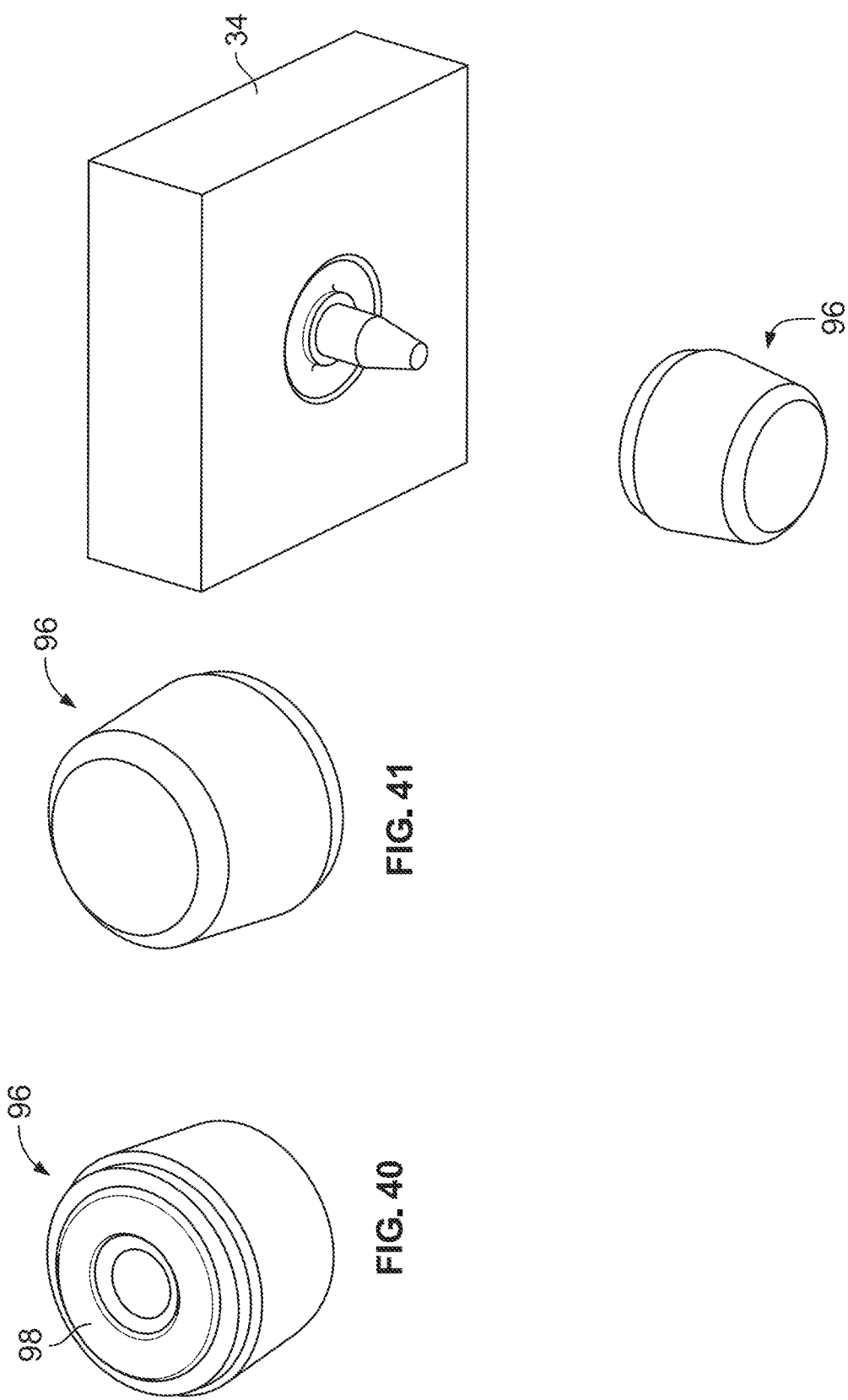

METHOD OF FORMING A TRANSPORTATION SYSTEM WITH AN OVER-MOLDED FRICTION ELEMENT

CROSS-REFERENCE TO RELATED APPLICATIONS

The present invention claims priority to and the benefit of U.S. Provisional Patent Application No. 62/947,332 filed Dec. 12, 2019, the contents of which are incorporated herein by reference and made a part hereof.

FEDERALLY SPONSORED RESEARCH OR DEVELOPMENT

N/A

FIELD OF THE INVENTION

The present invention is directed to a method for forming a pallet having a two-component friction element overmolded into the pallet, and to the resultant pallet.

DESCRIPTION OF THE PRIOR ART

One downside of certain plastic transportation systems, such as plastic pallets, is that they have a coefficient of friction that is inherently lower than their wood counterparts. This results in possible slippage of products on the system. Increasing the friction improves the handling property of loaded and unloaded systems.

There are a number of methods currently utilized to increase the friction on the upper surfaces of plastic transportation systems. As described below with respect to plastic pallets, each such known method has one or more drawbacks.

Some plastic pallets are roughed up after molding (e.g., with a disk grinder) to create a more textured upper surface. This has been found to have a relatively low increase of friction, and tends to wear off over time. Additionally, the process creates a large amount of dust and noise which must be dealt with.

In some instances a pallet can be molded to have various textures on the upper surface. Again, this only leads to a relatively low increase in friction and requires more complex molds. Similarly, the pallets can be formed with molded in spikes on the pallet deck (i.e., upper surface). However, the spikes tend to wear or break off over time, and can damage product placed on the pallet.

Adhesive-backed friction tape has been applied to a pallet deck to increase friction. However, good adhesion (of the tape) is difficult to achieve with typical pallet materials (e.g., HDPE, PP) and sometimes requires pre-treatment of the pallet (e.g., flaming). Additionally, tape can contaminate the recycling stream.

Snapped-in elastic grommets have also been used to increase friction. However, the grommets can fall out in use. This can be problematic for certain applications, such as transportation of food products.

Spin disks—quarter-sized molded thermoplastic-elastomer disks that are spin-welded to the upper surface of the pallet—have also been used. Spin disks, however, can only be placed onto well supported areas of the pallet due to high downward forces required during welding them on. Moreover, because the spin disk must be weldable, the material choices are limited.

One other method is to utilize integrated multi-shot friction elements where one or more elastic TPE materials are injected into the same mold that makes the pallet. Very expensive tooling having a multi-shot injection press is required. Additionally, the material selection for friction material is very limited. In this method, the technology requires the friction elements to be present in every pallet formed from the tooling—it is not optional.

Another method to increase friction is spray urethane on the pallet deck (i.e., this is similar to a truck bed liner). However, this method is extremely expensive and requires pretreatment of the pallet. The urethane becomes a contaminant when the pallet is placed in a regrind stream.

The present invention avoids many of the downsides of known methods, and provides a unique method and structure for providing increased friction on a transportation system.

SUMMARY OF THE INVENTION

The present invention is directed to a two-component friction element that is overmolded into a transportation system, such as a plastic pallet, and to a method for forming the pallet. In particular, the present method provides for integrating friction elements into a pallet without the risk of such elements falling out or dislodging. This makes the pallet suitable for all applications (e.g., including food transportation). Moreover, the same friction elements can be designed to provide simultaneous friction points on the top of the pallet deck, as well as on the bottom of the pallet deck. However, the elements can also be configured to provide only friction points on one surface (top or bottom), and can be placed in other areas of the pallet (e.g., the bottom deck).

The two-component friction element includes an outer carrier member formed from a rigid material, and an interior elastomeric material. The elastomeric material is contained in one or more cavities in the carrier member and has one or more exposed surfaces. A large variety of injection-moldable elastomeric materials can be used. The elastomeric materials do not have to chemically bond to the rigid materials of the carrier component.

The friction elements are preferably formed in an injection mold having two cavities (or multiples of two cavities). The mold is run in an injection molding machine having two barrels. The first barrel injects a relatively rigid material (preferably the same material type that is used for forming the pallet) into the first mold cavity to produce the outer carrier member. This outer carrier member is then transferred into the second mold cavity, preferably by an end-of-arm tool (EOAT) that is manipulated by an on-press robot. The second cavity of the mold is connected to the second barrel which, on the next shot, injects an elastomeric material, such as a thermoplastic elastomer, into the outer carrier member. While this elastomeric material is injected, a new outer carrier member is simultaneously produced in the first mold cavity. After the resins in both cavities solidify, the EOAT simultaneously removes the outer carrier member from the first mold cavity and the two-material finished friction element from the second cavity. The EOAT then transfers the freshly molded outer carrier member to the second cavity and unloads the friction element.

The friction elements are then loaded into a mold that forms the pallet (or a portion of the pallet that includes the friction element), preferably with an EAOT of the pallet mold. In some instances, the friction element can include an internal cylindrical or conically shaped (or possibly other shapes) channel, and can be loaded onto a standing pin in the mold. A pallet resin is then injected into the mold and the friction element is overmolded into the pallet (or portion thereof). The overmolded friction element is positioned so that the exposed elastomeric material forms a part of the surface (top and/or bottom) of the pallet deck. The outer rigid carrier member of the friction element can be chemically bonded to the pallet resin material (this is particularly true when the outer carrier member is formed from the same or similar material as that of the pallet), and/or have a structure (e.g., one or more recesses or extensions on the outer surface of the carrier member) that allow the pallet resin to mechanically hold the friction element in place.

In accordance with one aspect, the present invention provides a method for forming a transportation system with an over-molded friction element. The method comprises the steps of forming a rigid outer carrier member of a first friction element wherein the rigid outer carrier member has a cavity, placing an elastomeric material into the cavity of the outer carrier member to complete formation of the first friction element, and placing the completed first friction element into a mold for a transportation system. The method further comprises molding over an outer surface of the carrier member of the first friction element in the mold for the transportation system so that a first portion of the elastomeric material of the first friction member is exposed on a surface of the transportation system.

The steps of forming a rigid outer carrier member and placing an elastomeric material into the cavity of the rigid outer carrier member can comprise injecting the rigid material into a first cavity of a multi-cavity injection mold to form the outer carrier member, moving the rigid outer carrier member to a second cavity of the multi-cavity injection mold, and injecting the elastomeric material into the cavity of the rigid outer carrier member. The step of moving the outer carrier member to a second cavity of the multi-cavity injection mold can include using an end-of-arm tool to transfer the rigid outer carrier member from the first cavity of the multi-cavity injection mold to the second cavity of the multi-cavity injection mold. After forming the first friction element, the method can then include moving the first friction element from the multi-cavity injection mold onto a transportation system mold.

The step of forming a rigid outer carrier member can include forming the outer surface of the rigid outer carrier member into a conical shape. Moreover, the method can include forming a first recess on a top portion of the rigid outer carrier member and forming a second recess on a bottom portion of the rigid outer carrier member. In fact, the carrier member could also be formed into a variety of other shapes, such as cylindrical or oval, or having a plurality of planar surfaces with a rectangular cross-sectional shape (e.g., a pyramid shape having a rectangular base).

The step of molding over an outer surface of the carrier member of the first friction element in the mold for the transportation system so that a first portion of the elastomeric material of the first friction member is exposed on a first surface of the transportation system can comprise loading the first friction element onto a pin in the mold for the transportation system, and injecting a resin that forms the transportation system into the mold over portions of the first friction element. This step can also include exposing a second portion of the elastomeric material on a second surface of the transportation system opposed to the first surface. Additionally, this step can include mechanically trapping the first friction element in the transportation system.

A preferred transportation system that would benefit from the present method is a plastic pallet. Such pallets are typically used to transport a variety of goods from one location to another. The plastic pallets are typically formed using a plastic resin.

The rigid outer member of the friction elements is preferably formed from the same plastic resin as that used to form the pallet. The elastomeric material injected into the rigid carrier member of the friction element is preferably a thermoplastic elastomer.

In accordance with another aspect of the present invention, a method of forming a pallet with friction elements is provided. The method comprises forming a plurality of friction elements having an outer rigid carrier member and an elastomeric material positioned in a cavity of the outer rigid carrier member, positioning the plurality of friction elements into a pallet mold and injecting a resin into the pallet mold.

The step of forming a plurality of friction elements having an outer rigid carrier member and an elastomeric material positioned in a cavity of the outer rigid carrier member can include injecting a rigid material into a first cavity of an injection molding machine to form the outer rigid carrier member for each of the plurality of friction elements. This step can also include injecting an elastomeric material into the cavity of the outer rigid carrier member. Moreover, this step can also include moving the outer rigid carrier member from the first cavity of the injection molding machine to a second cavity of the injection molding machine prior to the step of injecting an elastomeric material into the cavity of the outer rigid carrier member. Additionally, the method can include forming one or more recesses or other structures into an outer surface of the rigid outer carrier member.

In accordance with yet another aspect of the invention, a pallet with molded in (i.e., overmolded) friction elements is provided. The pallet comprises a first friction element having a rigid outer carrier member having a first interior chamber, and an elastomeric material in the first interior chamber having an exposed upper surface. A pallet structure is molded over the first friction element so that the exposed upper surface of the elastomeric material of the first friction element forms part of the upper surface of the pallet structure. Additionally, the pallet can include a plurality of molded over friction elements.

The friction elements can also be formed to have a second interior chamber in the rigid outer carrier member and an elastomeric material in the second interior chamber having an exposed lower surface. Additionally, the rigid outer carrier member can include one or more recesses or other structure about an outer surface. This allows the resin of the plastic to lock the friction elements in place.

The friction elements can be formed in a variety of shapes. For example, the friction element can have a generally conical shape, or a cylindrical or oval shape. Additionally, the friction elements could be formed to have planar faces with a polygonal cross-sectional shape (e.g., rectangular), or to have other shapes including irregular shapes.

The pallet structure is formed from the resin material. Preferably, the rigid carrier member is also formed with the same or similar resin as the pallet. This facilitates thermal and/or chemical bonding of the pallet material to the outer surface of the rigid carrier member of the friction element. The elastomeric material in the cavities of the rigid carrier member is preferably a thermoplastic elastomer.

The rigid carrier member of the friction element can include an interior channel extending all or partway through the element. The channel can be cylindrical, or can have other shapes. The channel allows for easily placing the friction element on a post in the pallet mold.

Other features and advantages of the invention will be apparent from the following description, claims and drawings.

BRIEF DESCRIPTION OF DRAWINGS

To understand the present invention, it will now be described by way of example, with reference to the accompanying drawings in which:

FIG. 1 is a top perspective view of a friction element in accordance with an aspect of the present invention;

FIG. 2 is a bottom perspective view of a friction element of FIG. 1;

FIG. 3 is a cross-sectional view of the friction element of FIG. 1;

FIG. 4 is a cut-away view of the friction element of FIG. 1;

FIG. 5 is a perspective view of a friction element of FIG. 1 being placed on a portion of a cavity side of a mold for a pallet;

FIG. 6 is a bottom perspective view of a portion of a core side mold for the pallet for placement of a friction element;

FIG. 14 is a side plan view of the outer carrier member of FIG. 12;

FIG. 31 is a cross-sectional view of the portion of the pallet mold and the friction element of FIG. 30;

FIG. 35 is a cross-sectional view of the portion of the pallet mold and the friction element of FIG. 34;

FIG. 40 is a perspective top view of a friction element in accordance with another aspect of the present invention;

FIG. 41 is a bottom perspective view of the friction element of FIG. 40;

FIG. 42 is perspective view of a portion of a pallet mold and the friction element of FIG. 40;

DETAILED DESCRIPTION

Figure 7:
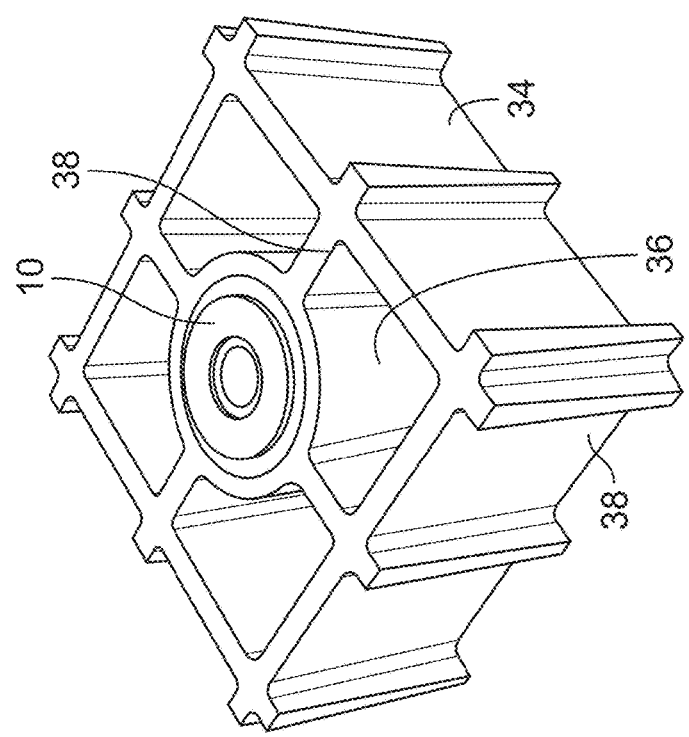
FIG. 7 is a top perspective view of a portion of a pallet formed in the mold portions of FIGS. 5 and 6 with a molded over friction element.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention is directed to a pallet (or other similar transportation system for moving products) with overmolded friction elements. The friction elements are formed in a first mold, and then placed in a mold for forming the pallet. The friction elements are then molded over in the pallet mold to form a pallet having exposed friction material on one or more surfaces.

Figure 17:
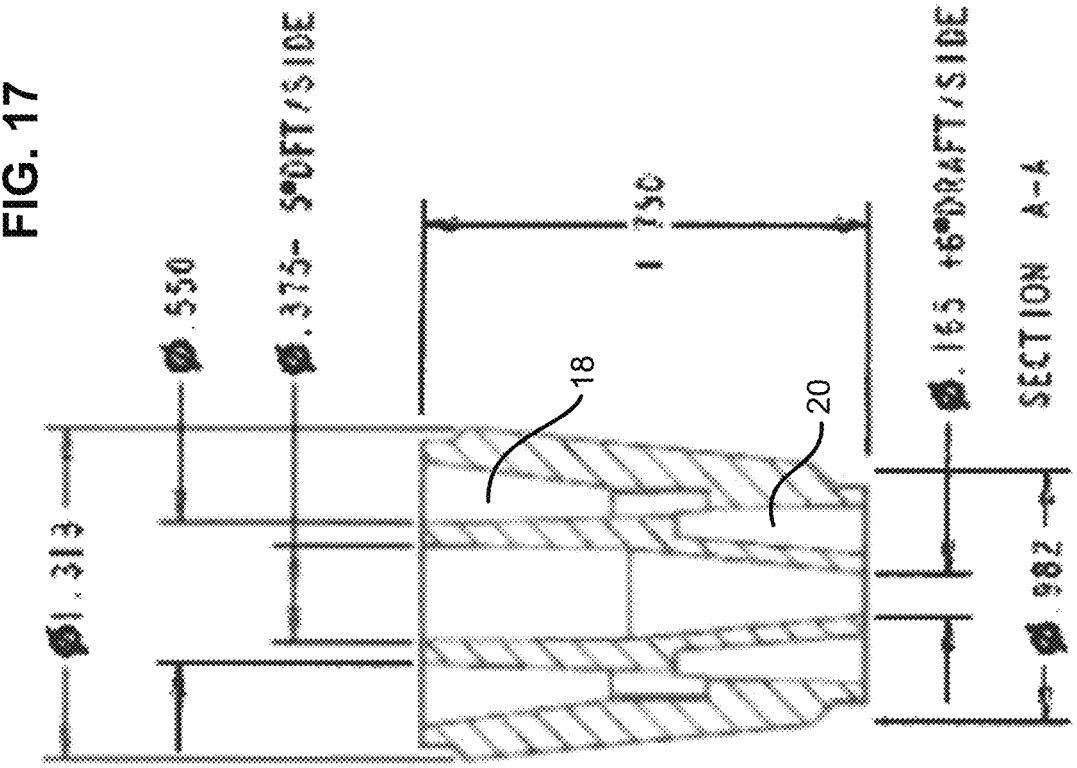
FIG. 17 is a vertical cross-sectional view of the outer carrier member of FIG. 12.
Figure 15:
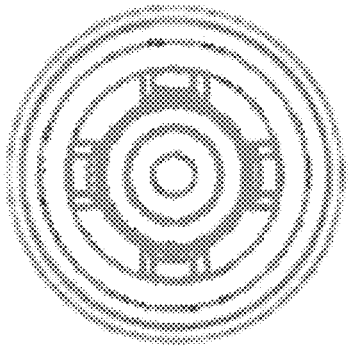
FIG. 15 is a top plan view of the outer carrier member of FIG. 12.
Figure 16:
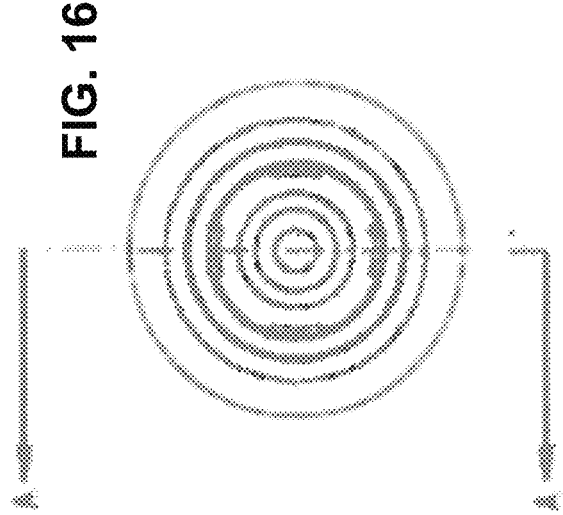
FIG. 16 is a bottom plan view of the outer carrier member of FIG. 12.
Figure 18:
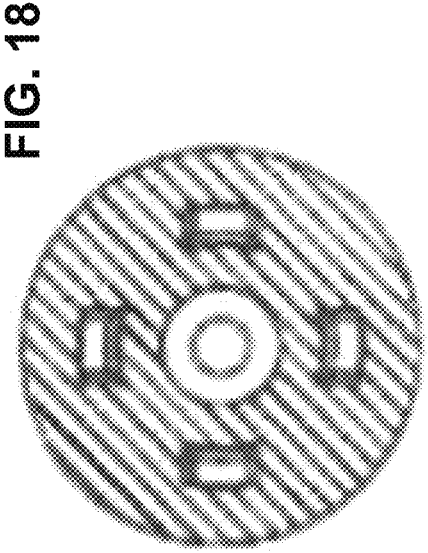
FIG. 18 is a horizontal cross-sectional view of the outer carrier member of FIG. 12.
Figure 20:
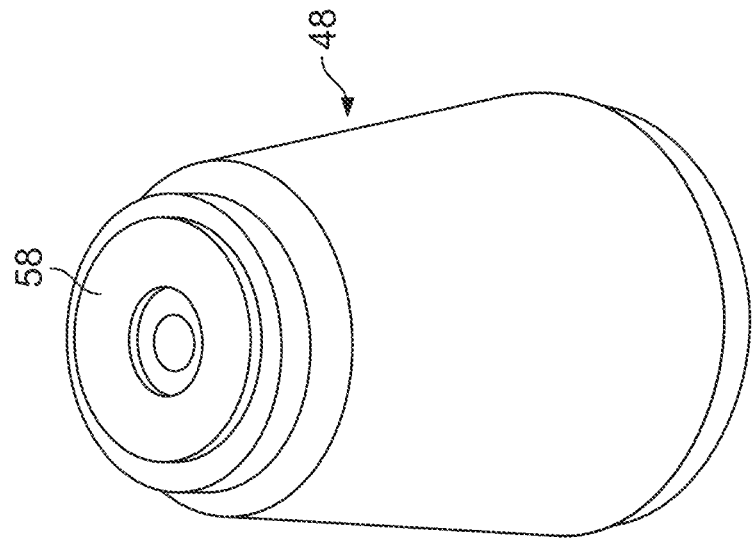
FIG. 20 is a bottom perspective view of the friction element of FIG. 19.
Figure 19:
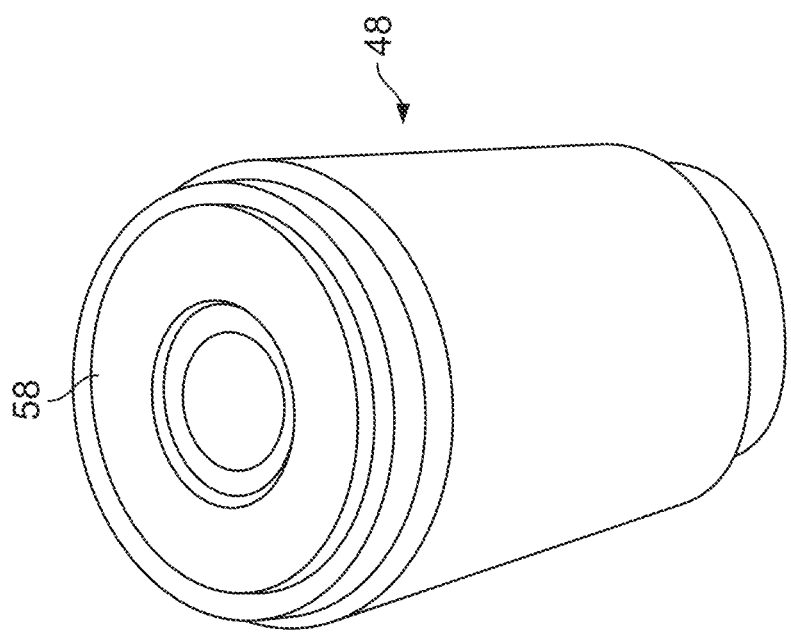
FIG. 19 is a to perspective view of a friction element formed from the outer carrier member of FIG. 12 with an elastomeric material in an interior cavity of the outer carrier member.
Figure 22:
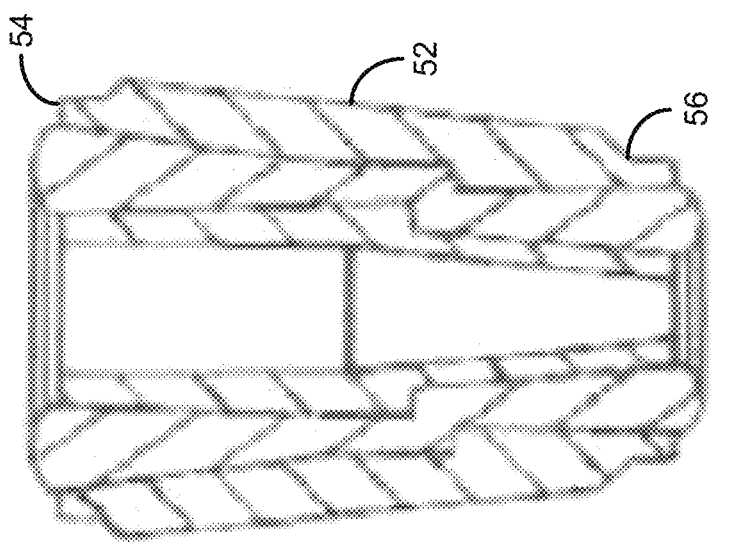
FIG. 22 is a vertical cross-sectional view of the friction element of FIG. 19.
Figure 21:
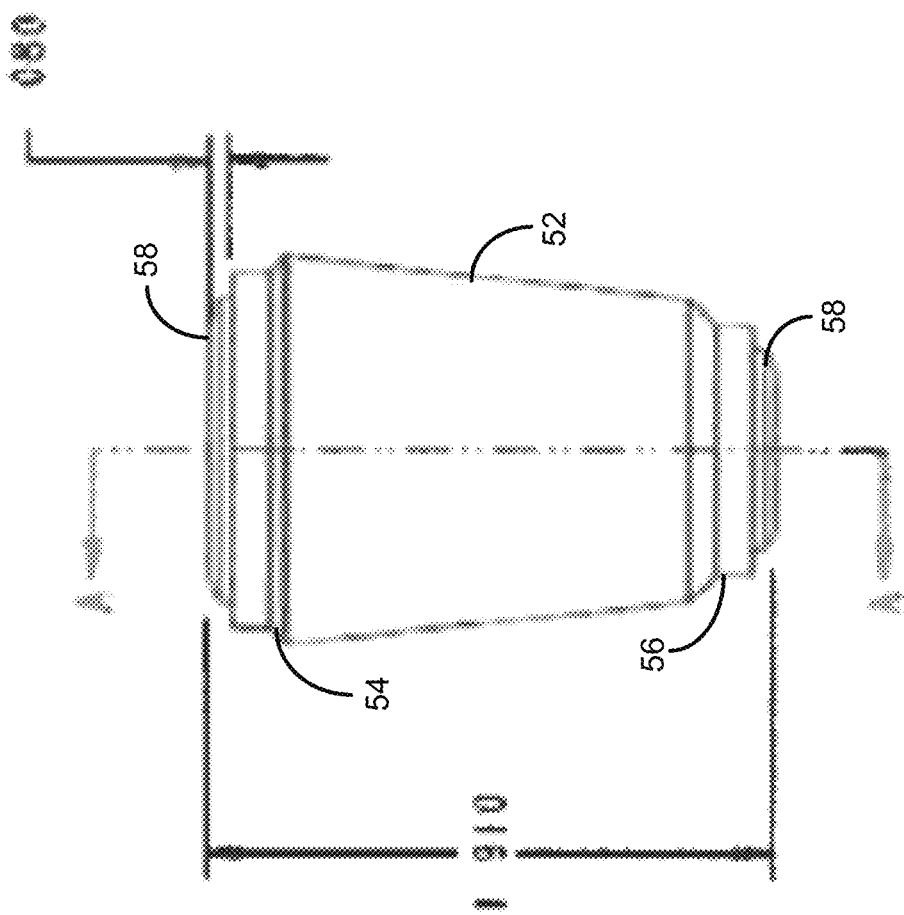
FIG. 21 is a side plan view of the friction element of FIG. 19.

FIGS. 1-4 show a two-component friction element 10 in accordance with an aspect of the present invention. The friction element 10 includes a rigid outer carrier member or portion 12 having a conically shaped outer surface 14. The friction element also includes an elastomeric material 16 that is shown exposed on and extending slight past the top and bottom ends of the outer carrier member. As illustrated in FIGS. 3 and 4 (and FIG. 17), the elastomeric material 16 is contained within cavities 18, 20 formed in the interior of the outer carrier member 12. The cavities 18, 20 extend between an outer wall 22 of the outer carrier member 12, and an inner wall 24 of the carrier member 12. The inner wall 24 defines a channel that extends through the friction element 10.

The friction elements 10 are preferably formed in a two shot injection molding process. The process is performed in an injection mold having two cavities (or in some instances multiples of two cavities can be used to form a plurality of friction elements at the same time) and two barrels of injectable material. In a first shot, the outer rigid carrier member 12 is formed in the first cavity with an injection of material from the first barrel. In most cases, the material used in the first barrel is the same or similar to the material used to form the pallet. The outer carrier member 12 is then moved to the second cavity of the mold (typically by an EAOT). The second shot is injection of an elastomeric material, such as a thermoplastic elastomer (TPE) that has the desired friction properties, from the second barrel into the cavities 18, 20 of the outer carrier member 12 (this occurs while a new carrier member is formed in the first cavity of the friction element mold).

The completed friction element 10 is then loaded into a pallet forming mold. As shown in FIG. 5, the pallet mold includes one or more mold portions 26 having pins or posts 28. The friction element 10 is positioned so that the pin 28 fits in the channel defined by the inner wall 24 of the friction element 10. In addition to being used during the pallet molding process, the channel defined by the inner wall 24 of the carrier member 12 of the friction element 10 allows for drainage on the finished pallet.

Figure 8:
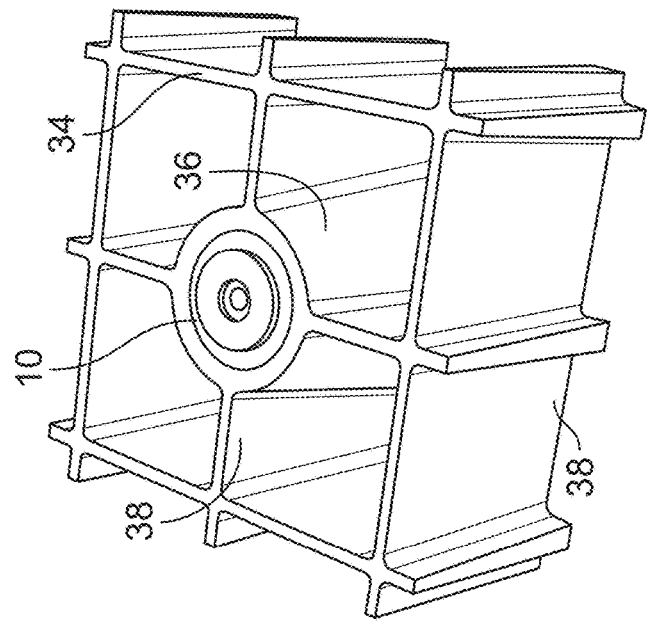
FIG. 8 is a bottom perspective view of the portion of a pallet of FIG. 7 formed in the mold portions of FIGS. 5 and 6 with the molded over friction element.
Figure 9:
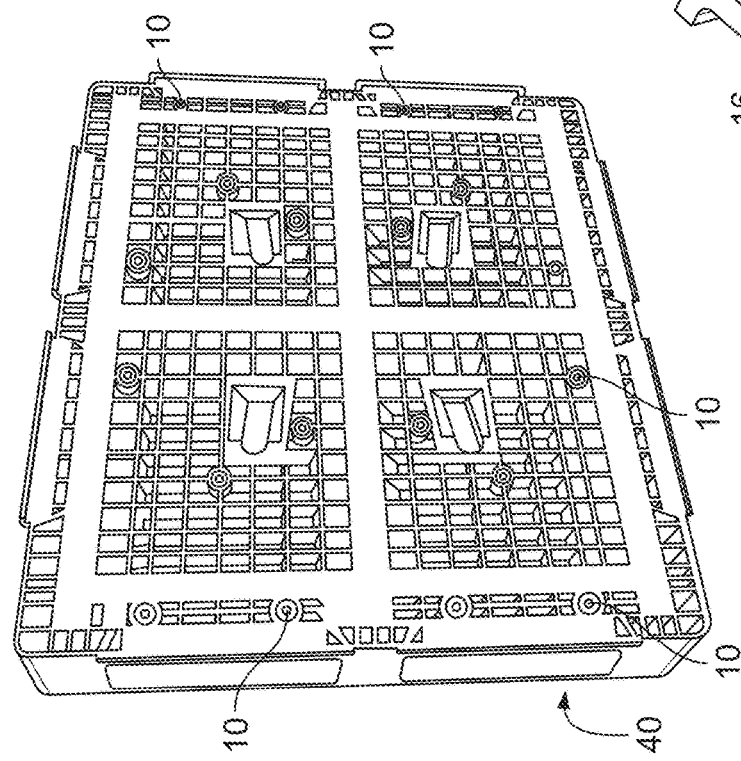
FIG. 9 is a perspective view of a pallet with a plurality of friction elements molded into the pallet.
Figure 13:
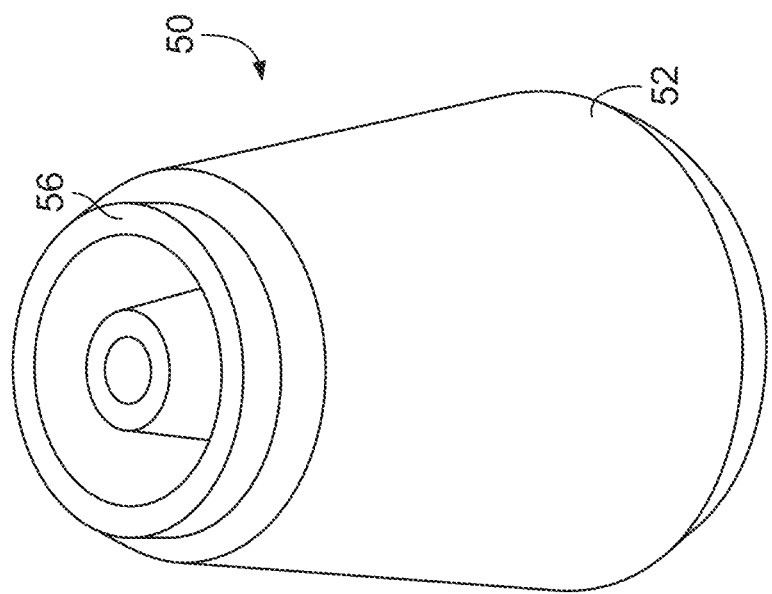
FIG. 13 is a bottom perspective view of the outer carrier member of FIG. 12.
Figure 12:
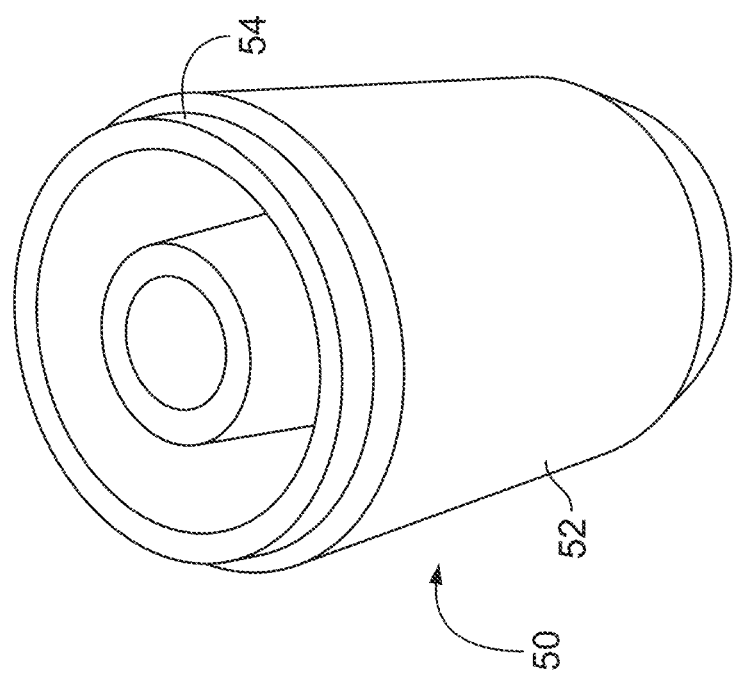
FIG. 12 is a top perspective view of an outer carrier member of a friction element having a first and second recessed portion in accordance with another aspect of the invention.

Preferably, the friction elements 10 are loaded on the mold portion 26 in the cavity side (i.e., stationary side) of the pallet mold. A core portion or side (i.e., moving side) 30 of the pallet mold, illustrated in FIG. 6, includes a cavity 32 that conforms to the outer shape of the friction elements 10. The pallet mold is closed and the resin that forms the pallet is injected into the mold, surrounding the outer surfaces 14 of the friction elements 10. FIGS. 7 and 8 show the top and bottom of a friction element 10, respectively, in a portion of a pallet 34. The pallet portion 34 includes a portion 36 surrounding the friction element 10 (i.e., overmolded), and a plurality of interconnecting ribs 38. The entire pallet 40 having a plurality of overmolded friction elements 10 is shown in FIG. 9. Typically, the pallet can include 20 or more friction elements 10.

Figure 10:
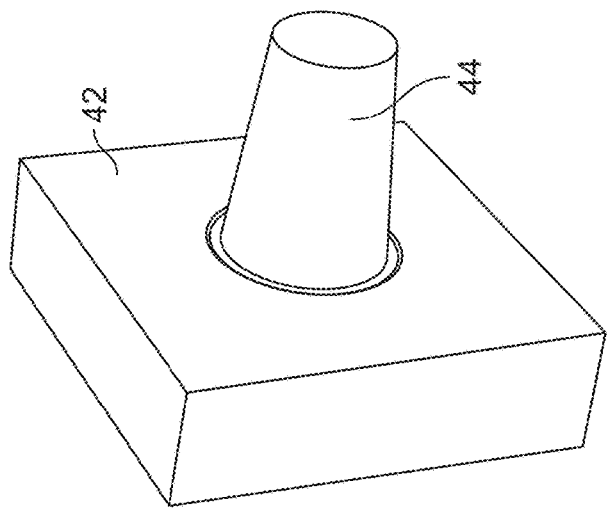
FIG. 10 is a perspective view of a portion of a core side mold for a pallet for instances where a friction element is not desired.
Figure 11:
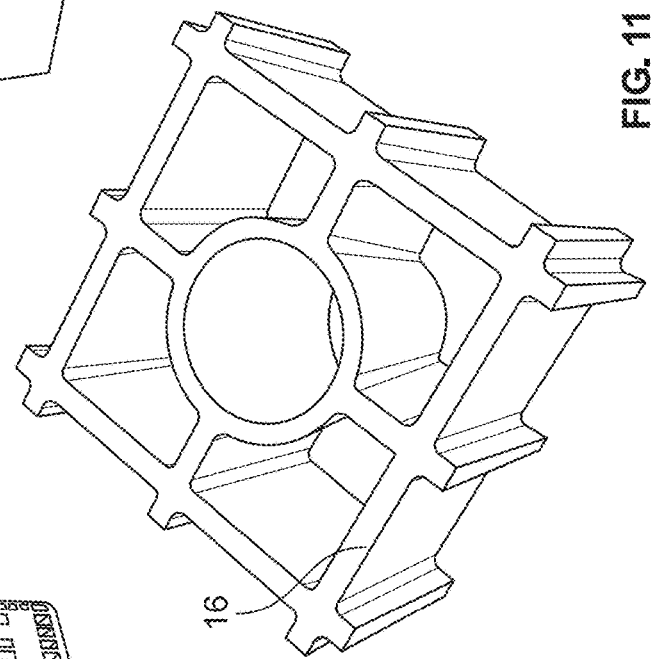
FIG. 11 is a perspective view of a portion of a pallet without a friction element.

In instances where a friction element is not desired at a particular location on the pallet, a modified mold portion 42, shown in FIG. 10, can be used. The mold portion 42 has an enlarged post 44 to replace the friction element. The top or core portion of the mold can be the same as that shown in FIG. 6. A portion 46 of the pallet formed from the mold portion 42 is shown in FIG. 11.

Another friction element 48 and its outer carrier member 50 are shown in FIGS. 12-20. The outer carrier member 50 includes a central outer surface portion 52 having a conical shape similar to the friction element 10 of FIGS. 1-11. However, the carrier member 50 also includes a first recessed groove 54 at the top of the carrier member 50 and a second recessed groove 56 at the bottom of the carrier member 50. The area defined by the recessed grooves 54, 56 is filled with resin when in the pallet mold (during the overmold process). This geometry creates a locking mechanism to mechanically trap the friction element 48 to the pallet portion 34 or pallet 40. Clearly, a large variety of structures (e.g. internal grooves, or ribs that extend outward) can be designed into the carrier member to lock the friction element to the pallet. This mechanical locking effectively holds the friction element 48 in place regardless of whether the pallet material thermally or chemically bonds to the material forming the outer surface of the carrier member.

As evident in FIGS. 19-22, the recessed grooves 54, 56 do not prevent the elastomeric material 58 from being exposed at the top or bottom of the friction element 48. As more clearly shown in FIGS. 21 and 22, the elastomeric material extends slightly above and below, respectively, the material of the carrier member 50.

Figure 23:
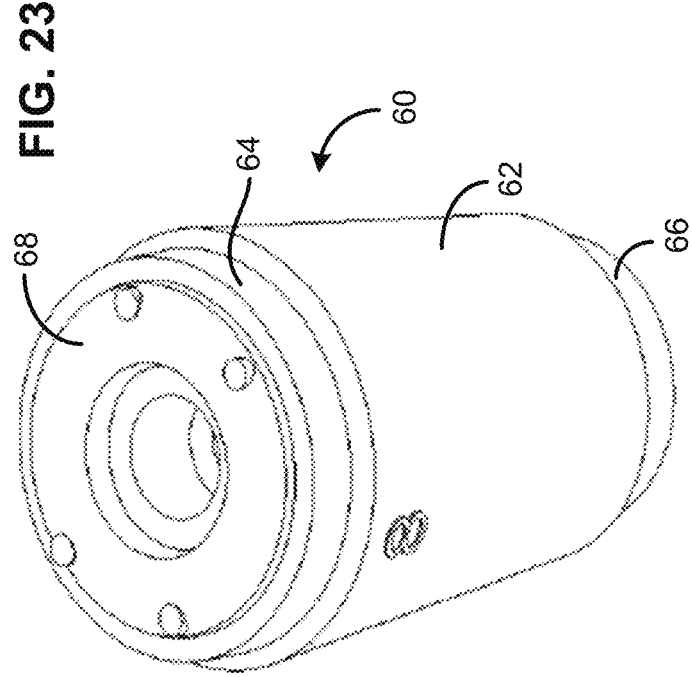
FIG. 23 is a perspective view of a friction element in accordance with another aspect of the present invention.
Figure 24:
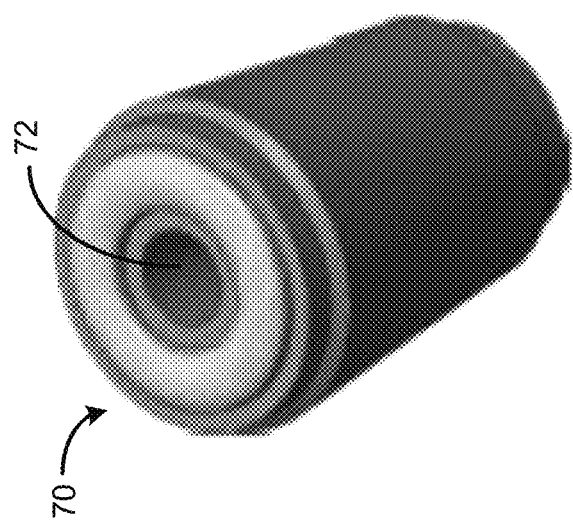
FIG. 24 is a perspective top view of a friction element in accordance with another aspect of the present invention.

Another version of a friction element 60 is shown in FIG. 23. The friction element 60 has an outer carrier member with a central portion having an outer surface 62 with a more cylindrical shape than the friction elements 10, 48 previously discussed. Recessed grooves 64, 66 are formed at the top and bottom of the carrier member. An elastomeric material 68 is shown on the top of the friction element 60.

Figure 25:
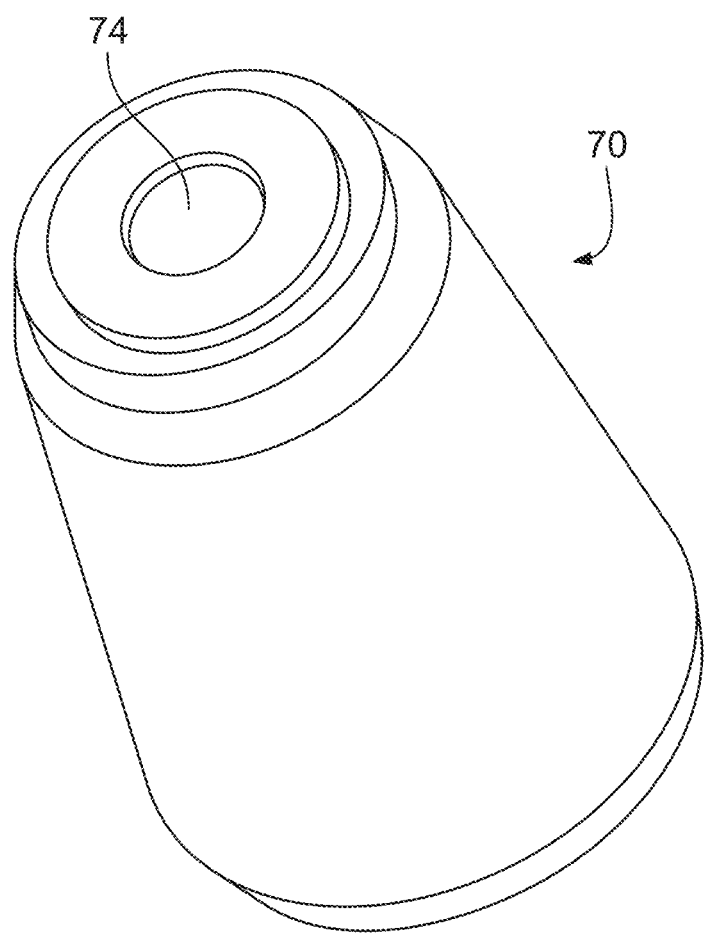
FIG. 25 is a bottom perspective view of the friction element of FIG. 24.
Figure 27:
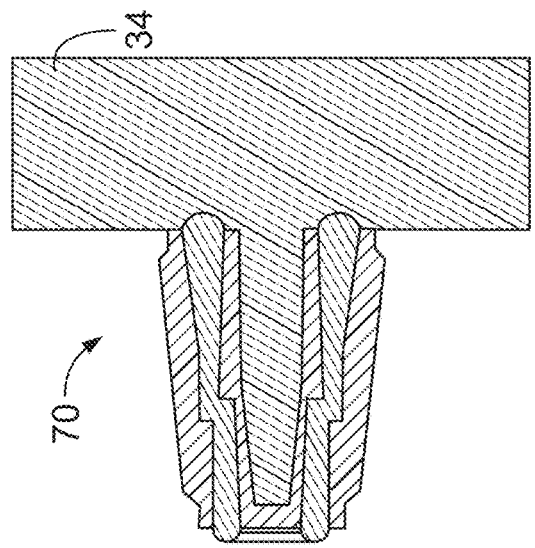
FIG. 27 is a cross-sectional view of the portion of the pallet mold and the friction element of FIG. 26.
Figure 26:
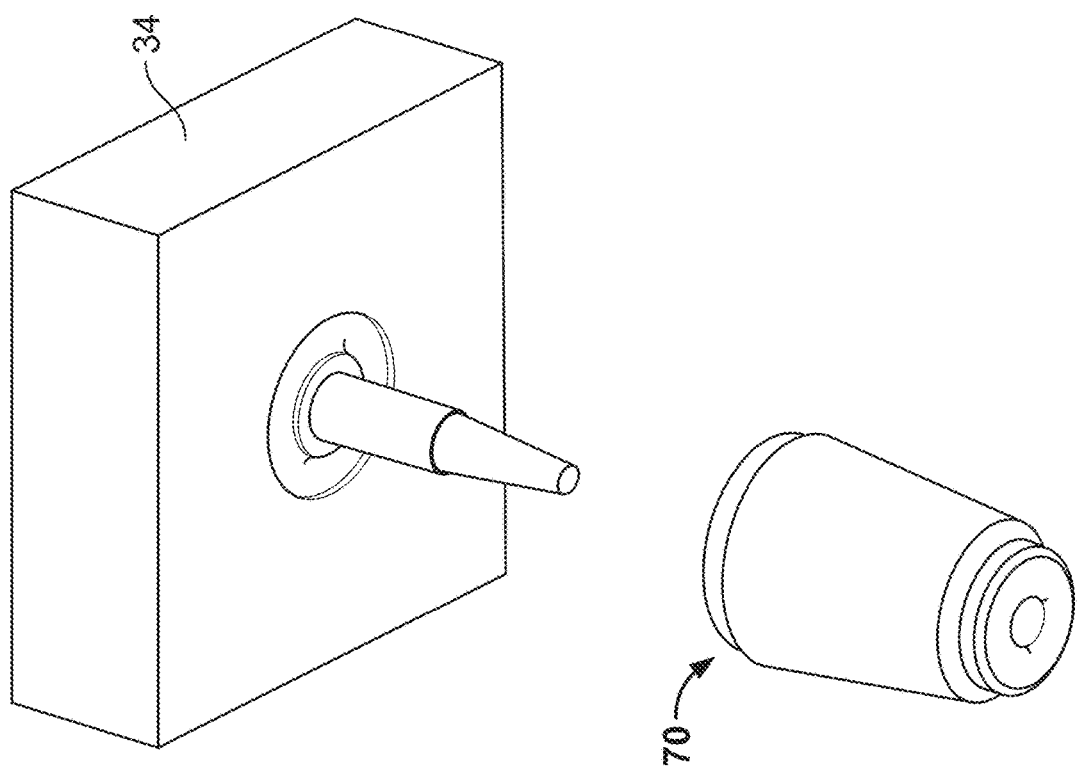
FIG. 26 is perspective view of a portion of a pallet mold and the friction element of FIG. 24.
Figure 30:
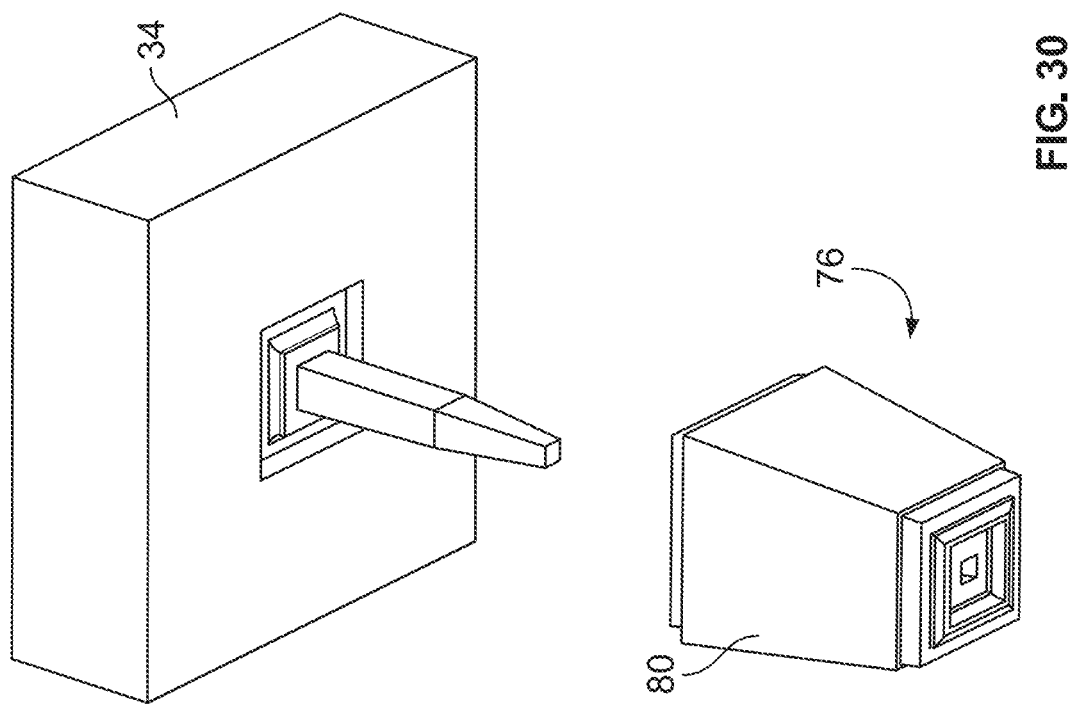
FIG. 30 is perspective view of a portion of a pallet mold and the friction element of FIG. 28.
Figure 29:
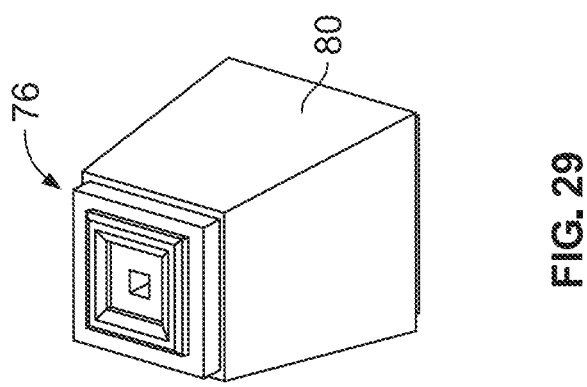
FIG. 29 is a bottom perspective view of the friction element of FIG. 28.
Figure 28:
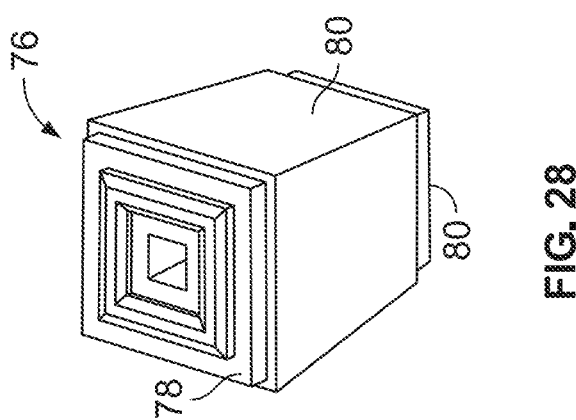
FIG. 28 is a perspective top view of a friction element in accordance with another aspect of the present invention.
Figure 34:
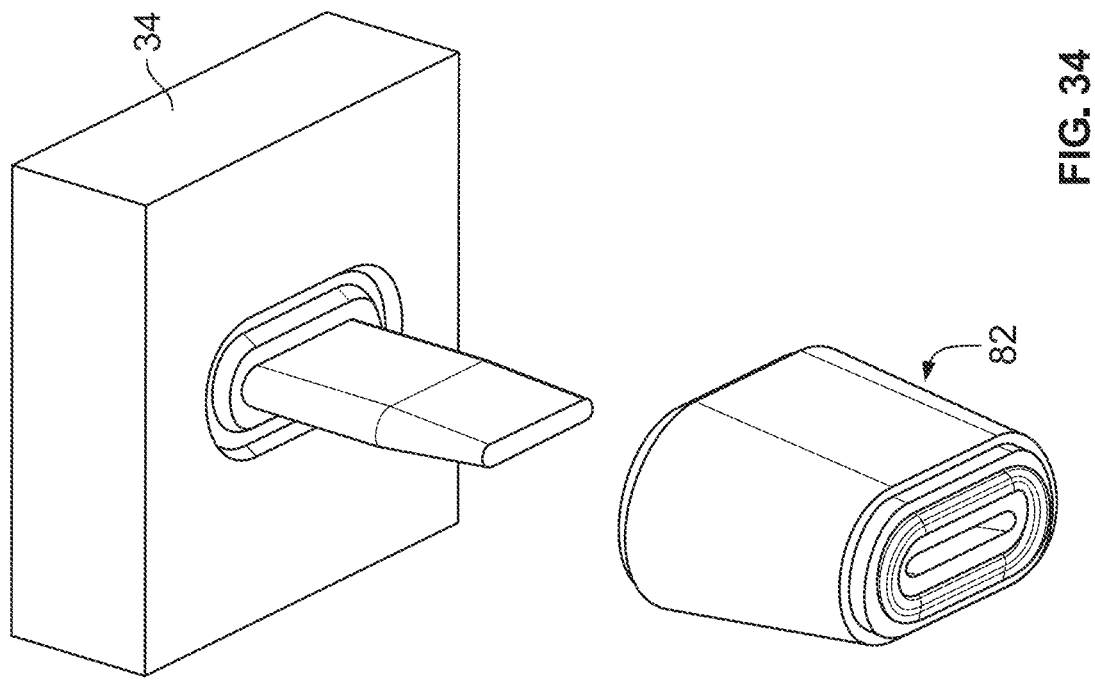
FIG. 34 is perspective view of a portion of a pallet mold and the friction element of FIG. 32.
Figure 33:
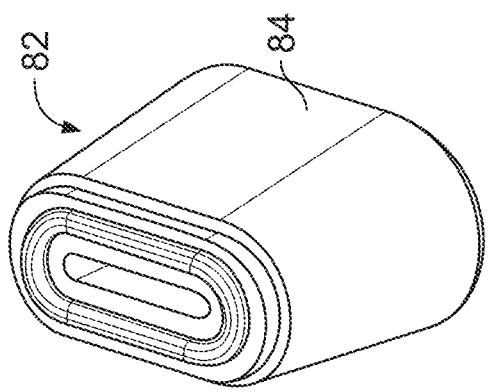
FIG. 33 is a bottom perspective view of the friction element of FIG. 32.
Figure 32:
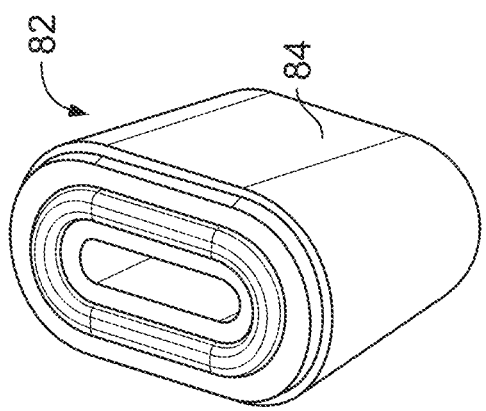
FIG. 32 is a perspective top view of a friction element in accordance with another aspect of the present invention.
Figure 38:
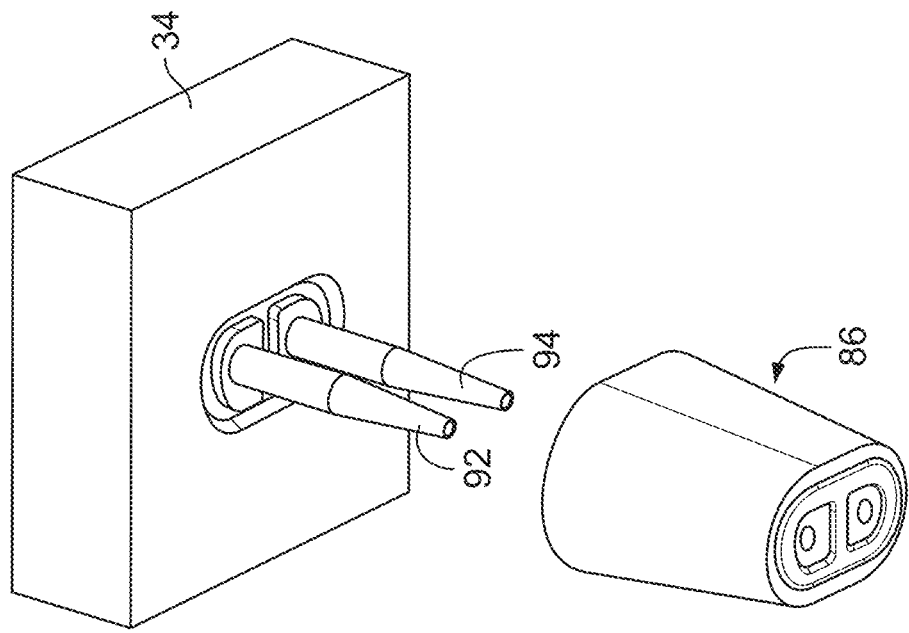
FIG. 38 is perspective view of a portion of a pallet mold and the friction element of FIG. 36.
Figure 37:
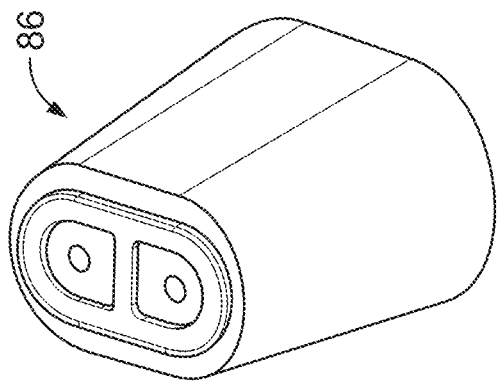
FIG. 37 is a bottom perspective view of the friction element of FIG. 36.
Figure 36:
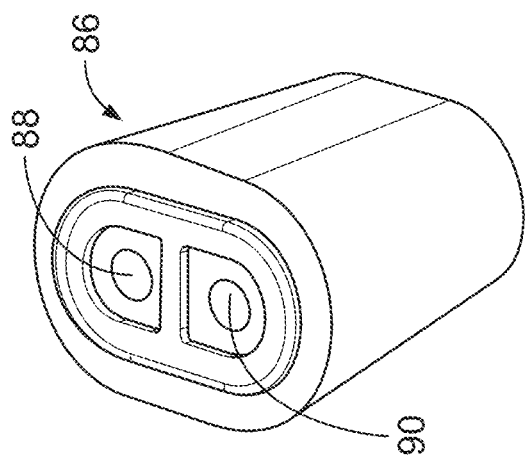
FIG. 36 is a perspective top view of a friction element in accordance with another aspect of the present invention.
Figure 39:
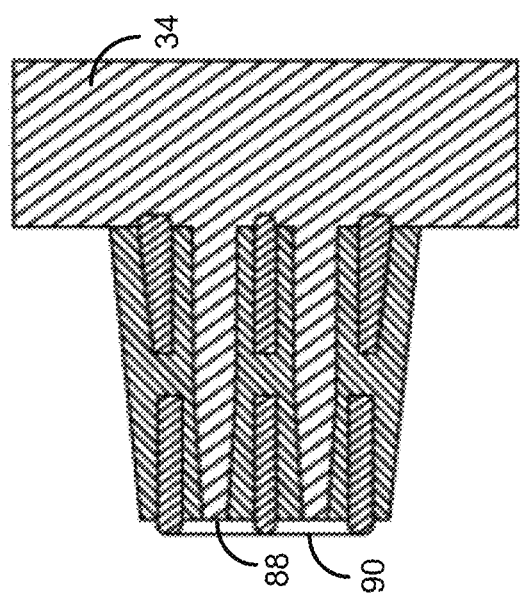
FIG. 39 is a cross-sectional view of the portion of the pallet mold and the friction element of FIG. 38.
Figure 43:
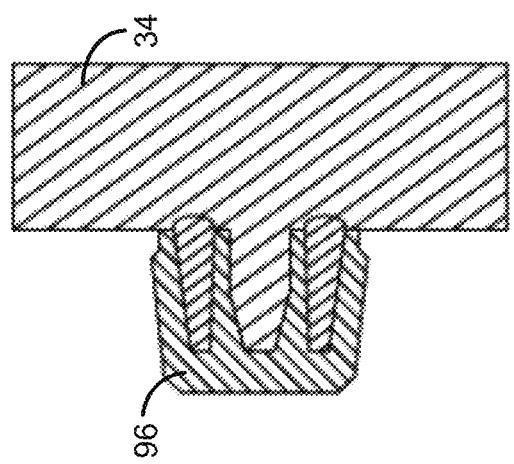
FIG. 43 is a cross-sectional view of the portion of the pallet mold and the friction element of FIG. 42.
Figure 44:
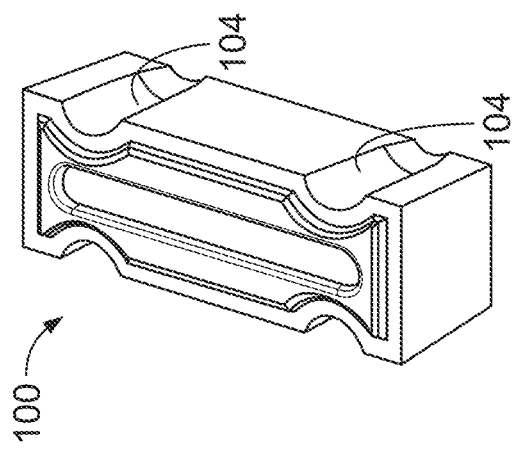
FIG. 44 is a perspective top view of a friction element in accordance with another aspect of the present invention.
Figure 45:
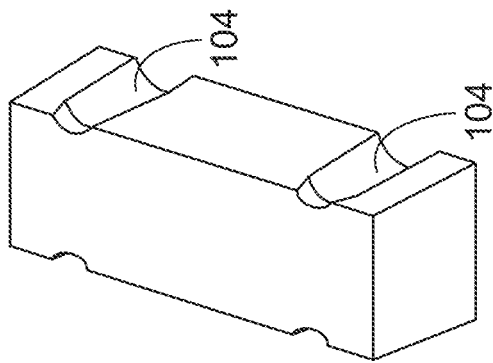
FIG. 45 is a bottom perspective view of the friction element of FIG. 44.
Figure 46:
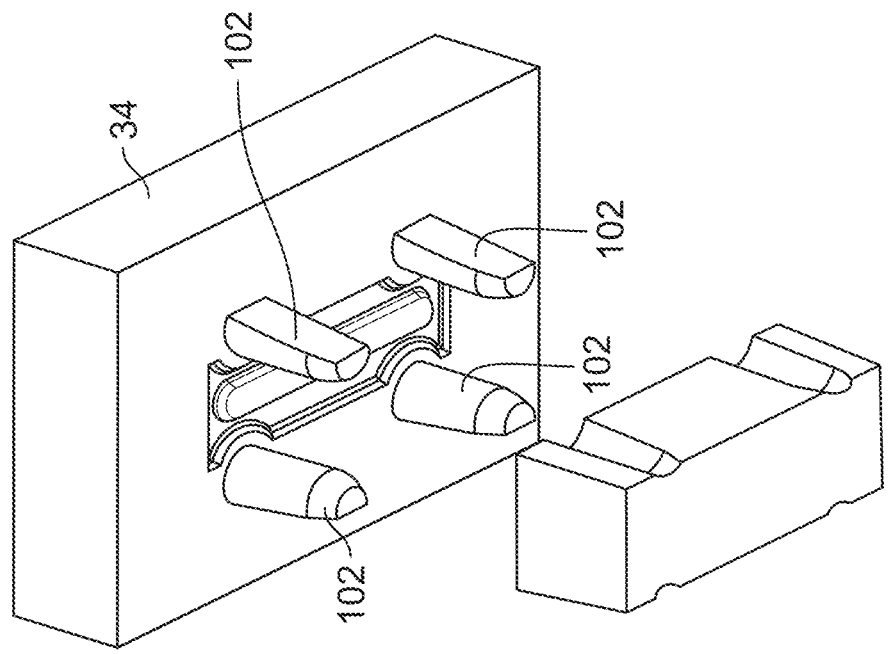
FIG. 46 is perspective view of a portion of a pallet mold and the friction element of FIG. 44; and, FIG. 47 is a cross-sectional view of the portion of the pallet mold and the friction element of FIG. 46.
Figure 47:
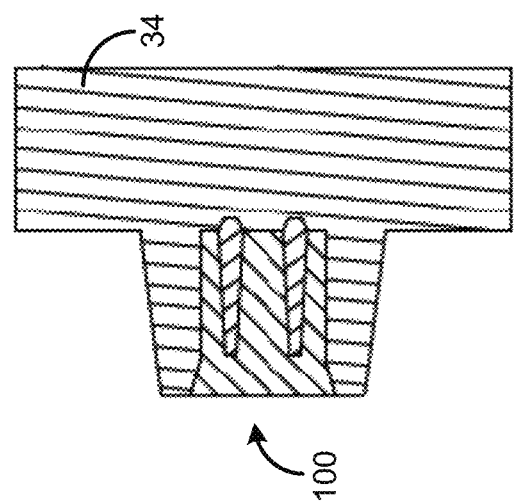

FIGS. 24-27 show a friction element 70 having an internal channel that is closed at one end. The friction element 70 can be loaded on a pallet mold portion 34 through the opening at the top of the channel 72 evident in the top view of FIG. 24. The bottom view of FIG. 25 shows the bottom end including a central bottom wall 74. The friction element 70 can be formed with recessed grooves or other similar structure.

FIGS. 28-31 show a friction element 76 having a rectangular shaped top end and bottom end. The carrier member 78 of the friction element 76 has a plurality of planar outer surfaces 80. Again, recessed grooves can be formed in the friction element 76. Fewer or more planar faces can be formed for other polygonal shaped ends.

FIGS. 32-35 show a friction element 82 having oval shaped ends and corresponding oval shaped outer surface 84. In each of the above alternatively shaped elements, a post that corresponds to the channel in each element is provided in the mold portion 34.

FIGS. 36-39 show a friction element 86 having an oval shape similar to that of FIGS. 32-35. In this example, the element includes two channels 88, 90. A mold portion having two posts 92, 94 is provided for positioning the friction element 86. The friction element can also be formed with more than two channels.

FIGS. 40-43 show a friction element 96 that only has an elastomeric material 98 exposed on one side. The channel also has a closed end similar to the friction element 70.

FIGS. 44-47 show a friction element 100 that does not include any internal channels for positioning on a mold portion. Instead, posts 102 on the mold fit into grooves 104 on the sides of the element 100. This friction element 100 only has the elastomeric material 106 exposed at one end.

While the friction elements are seen being held by posts in the mold portions, other means for securing the elements can be used. For example, a vacuum in the receptacle area for the friction element in the pallet mold can be used. Alternatively, the friction element can have a protruding structure which mates with a channel or opening in the mold portion. Moreover, an adhesive can utilized.

Many modifications and variations of the present invention are possible in light of the above teachings. It is, therefore, to be understood within the scope of the appended claims the invention may be protected otherwise than as specifically described.

I claim:

1. A method of forming a transportation system with an over-molded friction element comprising:

forming a rigid outer carrier member of a first friction element, the rigid outer carrier having a central channel defining a drain and a first upper cavity and a second lower cavity;
injecting an elastomeric material into the first cavity and the second cavity of the outer carrier member of the first friction element;
moving the rigid outer carrier member with the elastic material in the cavity of the rigid outer carrier member into a mold for a transportation system; and,
molding over an outer surface of the carrier member of the first friction element that was moved into the mold for the transportation system so that a first portion of the elastomeric material in the first cavity of the first friction member is exposed on an upper surface of the transportation system and a portion of the elastomeric material in the second cavity of the first friction member is exposed on a lower surface of the transportation system.

2. The method of claim 1 wherein the steps of forming a rigid outer carrier member of a first friction element, the rigid outer carrier having a central channel defining a drain and a first upper cavity and a second lower cavity and injecting an elastomeric material into the first cavity and the second cavity of the outer carrier member of the first friction element comprise:
injecting a rigid material into a first cavity of a multi-cavity injection mold to form the outer carrier member having a central channel defining a drain and a first upper cavity and a second lower cavity;
moving the outer carrier member to a second cavity of the multi-cavity injection mold; and,
injecting the elastomeric material into the first cavity of the outer carrier member and the second cavity of the outer carrier member after moving the outer carrier member into the second cavity of the multi-cavity injection mold.

3. The method of claim 2 wherein the step of moving the outer carrier member to a second cavity of the multi-cavity injection mold comprises:
using an end-of-arm tool to transfer the outer carrier member from the first cavity of the multi-cavity injection mold to the second cavity of the multi-cavity injection mold.

4. The method of claim 2 further comprising:
moving the first friction element from the multi-cavity injection mold onto a transportation system mold.

5. The method of claim 1 wherein the step of forming a rigid outer carrier member of a first friction element, the rigid outer carrier having a central channel defining a drain and a first upper cavity and a second lower cavity, comprises forming the outer surface of the rigid outer carrier member into a conical shape.

6. The method of claim 5 further comprising:
forming a first recess on a top portion of the rigid outer carrier member and forming a second recess on a bottom portion of the rigid outer carrier member.

7. The method of claim 1 wherein the step of forming a rigid outer carrier member having a cavity of a first friction element comprises forming the outer surface of the rigid outer carrier into a cylindrical shape.

8. The method of claim 1 wherein the step of forming a rigid outer carrier member having a cavity of a first friction element comprises forming the outer surface of the rigid carrier member into a plurality of planar surfaces.

9. The method of claim 8 wherein the step of forming the outer surface of the rigid carrier member into a plurality of planar outer surfaces provides a rectangular cross-sectional shape of the outer carrier member.

10. The method of claim 1 wherein the step of forming a rigid outer carrier member having a cavity of a first friction element comprises forming the outer surface of the rigid outer member into an oval shape.

11. The method of claim 1 wherein the transportation system is a plastic pallet.

12. The method of claim 1 wherein the step of molding over an outer surface of the carrier member of the first friction element that was moved into the mold for the transportation system so that a first portion of the elastomeric material in the first cavity of the first friction member is exposed on an upper surface of the transportation system and a portion of the elastomeric material in the second cavity of the first friction member is exposed on a lower surface of the transportation system comprises:
loading the first friction element onto a pin in the mold for the transportation system; and,
injecting a resin that forms the transportation system into the mold over portions of the first friction element.

13. The method of claim 1 wherein the elastomeric material is a thermoplastic elastomer.

14. The method of claim 1 wherein the step of molding over an outer surface of the carrier member of the first friction element that was moved into the mold for the transportation system so that a first portion of the elastomeric material in the first cavity of the first friction member is exposed on an upper surface of the transportation system and a portion of the elastomeric material in the second cavity of the first friction member is exposed on a lower surface of the transportation system comprises:
mechanically trapping the first friction element in the transportation system.

15. A method of forming a pallet with friction elements comprising:
forming a plurality of friction elements having an outer rigid carrier member with a drain channel and injecting an elastomeric material in a cavity of the outer rigid carrier member; and,
positioning the plurality of friction elements having an outer rigid carrier member with a drain channel and injecting an elastomeric material in a cavity of the outer rigid carrier member into a pallet mold and injecting a resin into the pallet mold.

16. The method of claim 15 wherein the step of forming a plurality of friction elements having an outer rigid carrier member with a drain channel and injecting an elastomeric material in a cavity of the outer rigid carrier member comprises:
injecting a rigid material into a first cavity of an injection molding machine to form the outer rigid carrier member for each of the plurality of friction elements.

17. The method of claim 16 further comprising:
moving the outer rigid carrier member from the first cavity of the injection molding machine to a second cavity of the injection molding machine prior to the step of injecting an elastomeric material into the cavity of the outer rigid carrier member.

18. The method of claim 16 wherein the step of injecting a rigid material into a first cavity of an injection molding machine to form the outer rigid carrier member for each of the plurality of friction elements comprises:
forming a recess into an outer surface of the rigid outer carrier member.

* * * * *